RADAR-BEACON SYSTEM WITH TWO-WAY COMMUNICATION CAPABILITY

Filed Sept. 19, 1966 3 Sheets-Sheet 1

INVENTOR.
A.-E. HOFFMANN-HEYDEN
BY Harry A. Herbert Jr
ATTORNEY
James S. Shannon
AGENT INVENTOR.
A.-E. HOFFMANN-HEYDEN
BY Harry A. Herbert Jr
ATTORNEY
James S. Shannon
AGENT INVENTOR.
A-E. HOFFMANN-HEYDEN
BY Harry A. Herbert Jr
ATTORNEY
James S. Shannon
AGENT 3,359,554

RADAR-BEACON SYSTEM WITH TWO-WAY COMMUNICATION CAPABILITY

Adolf-E. Hoffmann-Heyden, Eau Gallie, Fla., assignor, by mesne assignments, to the United States of America as represented by the Secretary of the Air Force Filed Sept. 19, 1966, Ser. No. 580,547
3 Claims. (Cl. 343—6.5)

Figure 1:
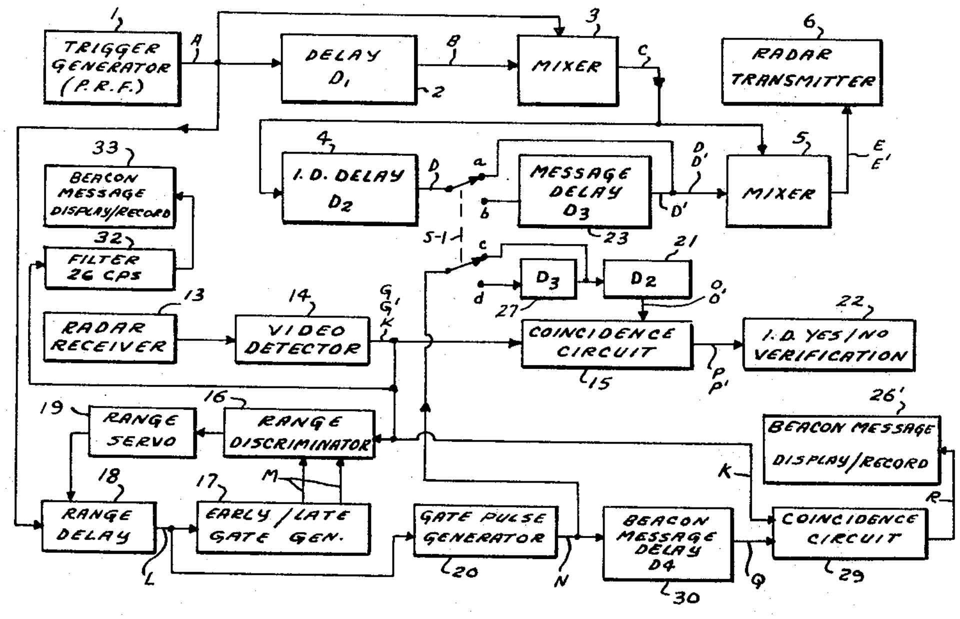

During the terminal flight phase of spacecraft, the voice communication links are blocked by reentry ionization for a time interval of several minutes. Experience has shown however that the C-band radar-beacon loop used to track the spacecraft has remained operative during this period despite noticeable attenuation of the radio frequency signal. In view of the importance of maintaining some message exchange during this critical flight portion, it is the principal object of this invention to devise means for modifying the C-band radar pulse transmissions between the ground station and the beacon on the spacecraft, and between the beacon and the ground station, to permit two-way communication therebetween. A further object of the invention is to provide such communication channels with minimum modification of the radar and beacon equipments and without interfering in any way with the basic tracking function of the radar-beacon system.

Described briefly, message transmission between the ground station and the beacon is accomplished by changing the time interval between the tracking pulse and the I.D. (identification pulse) a predetermined amount. A message detector at the beacon is designed to respond to a pulse pair of this predetermined spacing. Message transmission between the beacon and the ground station is accomplished by inserting an additional pulse between the tracking and I.D. pulses of the return transmission at a predetermined time spacing from the tracking pulse. A message detector at the ground station responds to a pulse pair of this time spacing. Suitable means are provided at the ground station and at the beacon station for switching between message "on" conditions in which the I.D. pulse is repositioned at the ground station and an additional pulse inserted at the beacon, as described above, and a message "off" condition in which the I.D. pulse has its normal position and the added pulse is absent. The outputs of the message detectors are zero for the "off" condition and are series of pulses at the P.R.F. (pulse repetition frequency) of the radar system for the "on" condition. Therefore, by switching between the "on" and "off" conditions there is obtained in effect a pulse modulation of a carrier of the radar pulse repetition frequency.

The information bandwidth in the above described system is of course limited by the P.R.F. of the radar system. The highest modulation frequency ($f_h$) and the bandwidth $b$ available for real time modulation are related to the P.R.F. ($f_r$) by $$f_r = 2f_h/m$$

where $m$ is the largest integer not exceeding $f_h/b$ and $b$ is the modulation bandwidth $f_h - f_l$. For example, for a typical C-band radar system having $f_r = 142$ p.p.s. for the shorter ranges and $f_r = 71$ p.p.s. for the longer ranges, the highest modulation frequencies ($f_h$) would be 71 c.p.s. and 35.5 c.p.s. respectively. Obviously, with these pulse repetition frequencies, real time speech transmission cannot be accomplished. However, telegraphic or Morse code communication, especially if hand-keyed, and the transmission of other relatively low frequency information such as heartbeat are well within the limits of the system.

Figure 2:
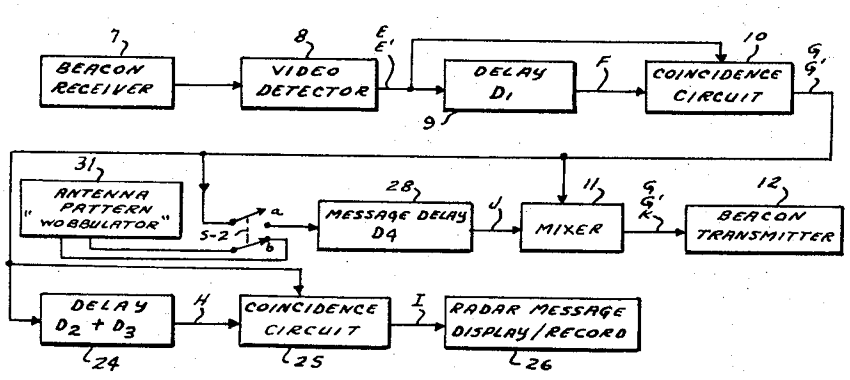
Figure 3:
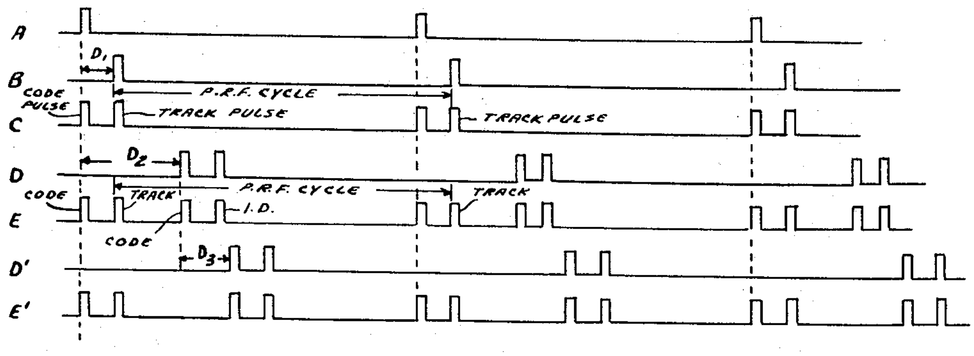
Figure 4:
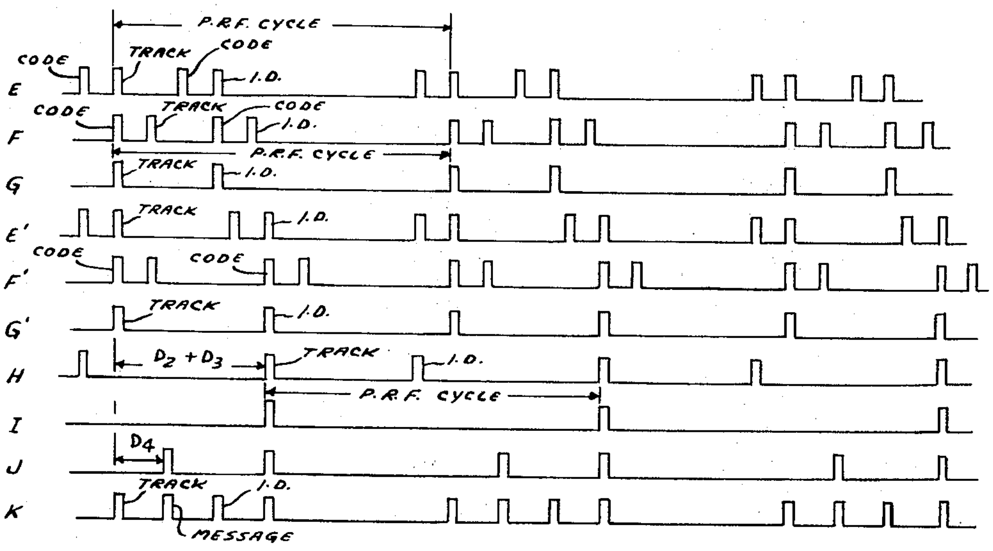
Figure 5:
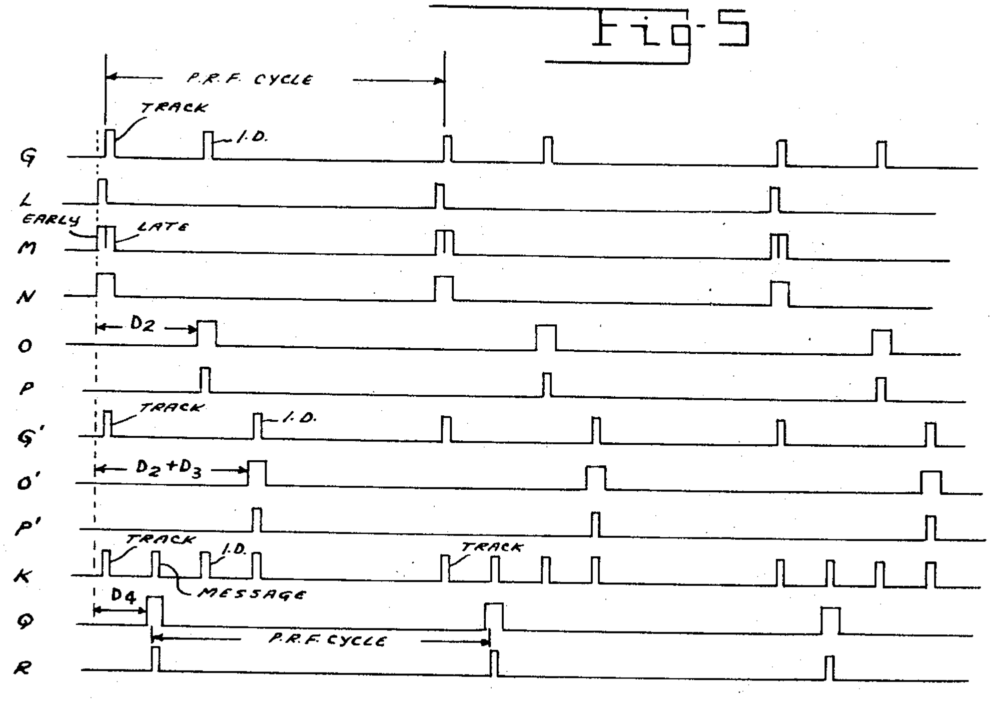
Figure 6:
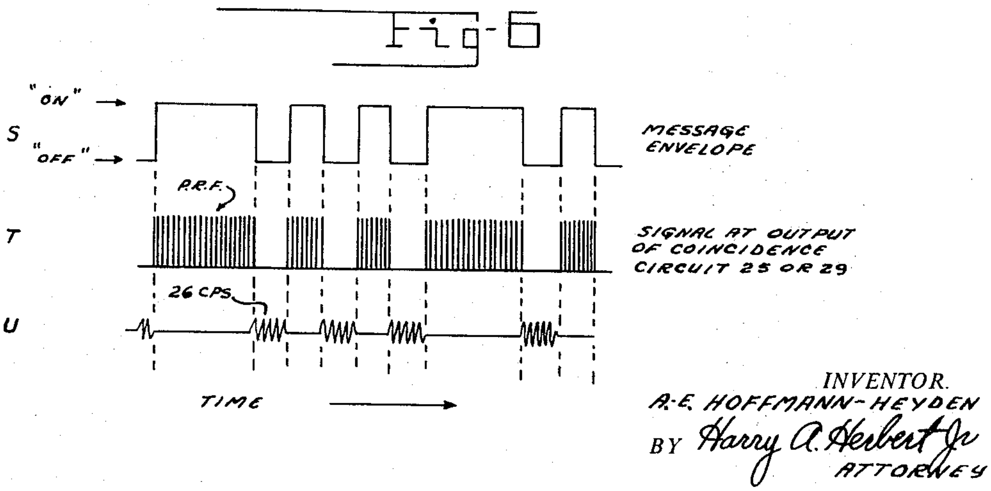

The invention will be described in more detail with reference to the specific embodiment thereof shown in the accompanying drawings in which:

FIG. 1 is a block diagram of a portion of a ground radar station incorporating the invention, FIG. 2 is a block diagram of a radar beacon incorporating the invention, FIGS. 3, 4 and 5 are waveforms occurring at various points in the communication system, and FIG. 6 illustrates a typical transmission over the described communication system.

A typical spacecraft tracking range employs a plurality of precision tracking radars of the monopulse type arranged along the ground track of the spacecraft to continuously determine the position of the spacecraft during flight. Target distance is measured by evaluating the round trip time between a transmitted pulse and its return from the target, and target direction, in terms of azimuth and elevation relative to the radar, is measured by means of a steerable highly directional antenna which orients itself automatically in the direction of the electromagnetic radiation returning from the target. In order to achieve a high quality return signal from the target a radar beacon is usually carried by the space craft rather than depending upon the signal reflected from the surface of the spacecraft.

In the interest of coverage reliability, coverage continuity, and overdetermined position measurements, it is desirable that a target can be tracked simultaneously by several radars. In order to avoid interrogation crowding with attendant return ambiguity or pulse cancellations, time sequenced beacon interrogation, or beacon time sharing must be employed. Further, in order to avoid errors that would result if one radar responded to the return from another radar, I.D. or identification pulse coding is employed to insure that each radar responds only to returns identified as resulting from that radar's transmission.

In order to protect the spacecraft beacon against random pulse interference which might result in unwanted beacon triggering, coded beacon interrogation is used. This is usually accomplished by radiating a pair of pulses of fixed time separation rather than a single interrogating pulse, and equipping the beacon with a decoder which responds only upon reception of a pair of pulses having this time separation.

Finally, antenna pattern "wobbulation" is usually employed at the spacecraft to improve the directional tracking. The necessity for this is brought about by the use on the spacecraft of multiple antennas fed from a common source in order to achieve near omnidirectional radiation coverage. The overall pattern of these antennas contains interference regions of alternating gain maxima and minima. When used for radar beacons, the lobe structure of the interference regions generates shifts of the radar's electrical balance point in a fashion analogous to target "glint" in radars operating on the reflected return. Virtual smoothing of the interference regions can be accomplished by moving the pattern relative to the radar's line of sight at a frequency exceeding the radar's response. The pattern displacement can be achieved mechanically or by electrical phase-time modulation of one or more antennas of the configuration, called "wobbulation." This manifests itself at the radar by periodic signal strength variations which can be detected by circuits responding to the "wobbulation" frequency. As will be seen later, this feature of the beacon may be used as a back-up for the beacon-to-radar communication channel.

FIG. 1 shows in block form as much of a ground radar station of the type described as is necessary to illustrate the addition of a communication channel thereto in accordance with the invention. Referring to this figure, 1 is a trigger pulse generator which produces a series of pulses of constant P.R.F. or pulse repetition frequency. These pulses are illustrated by waveform A in FIG. 3.

In order to obtain the previously mentioned coded beacon interrogation signal, the output of generator 1 is applied both directly and through delay circuit 2 to mixer 3. The mixer combines the delayed pulses from delay circuit 2, shown by waveform B, with the undelayed pulses to produce the required coded pulse pair with fixed time separation $D_1$, illustrated by waveform C in FIG. 3.

In order to obtain the previously mentioned I.D. or identification pulse coding, the output C of mixer 3 is applied both directly and through I.D. delay circuit 4 and normally closed contacts *a* of a message sender switch S–1 to mixer 5. The output of circuit 4, delayed by time interval $D_2$, is shown by waveform D. Mixer 5 combines waves C and D to produce the radar output video signal, waveform E, which is applied to radar transmitter 6 for radiation to the beacon. As seen in waveform E, this signal consists of a track pulse preceded by an interval $D_1$ by a code pulse, and an I.D. pulse similarly preceded by a code pulse but following the track pulse by an interval $D_2$. As will be seen later, a decoder is provided at the output of the radar receiver to identify pulse pairs with the $D_2$ spacing thus avoiding confusion with returns from other radars which would be provided with spacings different from $D_2$.

Referring to FIGS. 2 and 4, the signal radiated by transmitter 6 of FIG 1 is received by beacon receiver 7 and detected by video detector 8. The video output of this detector is represented by waveform E and corresponds to the output E of mixer 5 (FIG. 1) delayed by the transmission time between the radar and the beacon. Delay circuit 9 and coincidence circuit 10 operate as a decoder for pulse pairs having a time spacing $D_1$. The output of circuits 9 and 10 are represented by waveforms F and G, respectively, in FIG. 4. As seen in this figure, coincidences of the track and I.D. pulses of wave E with the code pulses of wave F produce track and I.D. pulses in the output of coincidence circuit 10, represented by wave G. This signal is applied through mixer 11 to beacon transmitter 12 for radiation back to the radar ground station of FIG. 1.

Referring again to FIG. 1, the transmission from the beacon is received by radar receiver and demodulated by video detector 14 to produce the video output represented by waveform G of FIG. 5. This wave is identical to wave G at the output of coincidence circuit 10 of the beacon (FIG. 2) except that it is delayed by the transmission time between the beacon and the ground radar station. The video output G is applied to coincidence circuit 15 and to range discriminator 16.

Range discriminator 16, early/late gate generator 17, variable range delay 18 and range servo 19 are all parts of the regular range tracking system of the radar and their construction and operation are well known in the art. Briefly, the trigger pulses A produced by trigger generator 1 are delayed by range delay 18 and applied to early/late gate generator 17. They trigger this generator to produce an early gate followed by an adjacent late gate, these gates being applied to range discriminator 16 along with the track and I.D. pulses of the video wave G. The delayed trigger pulses are represented by waveform L and the early and late gates are represented by waveform M in FIG. 5. When tracking the target in range, the juncture of the early and late gates is centered on the track pulse so that equal portions of the track pulse pass through each gate. The range discriminator produces an output proportional to the difference in the amounts of the track pulse that pass through the two gates, which output is applied to and serves to control range servo 19. If the amounts passing the two gates are equal, the range servo remanis deenergized and no change occurs in range delay 18. Should the range of the target tend to change, the track pulse would correspondingly move along the time axis causing an increase in transmission through one gate and a decrease through the other, depending upon the direction of the change. This in turn produces an output to the range servo of such polarity as to change the range delay 18, through servo 19, in the proper direction to again bring the two gates into symmetry with the center of the track pulse.

In order to identify the radar return as one resulting from and interrogation by this radar rather than by one of the other radars in the system, the delay trigger pulses L are used to trigger the generation, by generator 20, of gate pulses, represented by waveform N of FIG. 5, which are applied through normally closed contacts *c* of S–1 to delay circuit 21 where they are delayed by the characteristic I.D. interval $D_2$ for this radar. The delayed gates, which are illustrated by waveform O in FIG. 5, are applied to coincidence circuit 15 along with the return video G. If the I.D. pulse in the video has the proper delay $D_2$, it passes circuit 15, as illustrated by waveform P, and is applied to a suitable device 22 for indicating its presence.

All of foregoing relates to the normal operation of a radar-beacon system before addition of the communication channels in accordance with the invention. It also accurately describes the operation of the modified system in the message "off" condition, i.e. the condition when sender switch S–1 is not actuated. The modification required for the radar-to-beacon communication channel will be described first.

In the radar-to-beacon link the message "on" condition is characterized by a repositioning in time of the I.D. pulse. This is accomplished by delay circuit 23 in FIG. 1. To establish the message "on" condition message sender switch S–1 is actuated to close normally open contacts *b* and *d*. Closure of contacts *b* causes the delayed pulse wave D at the output of delay 4 to undergo an additional delay $D_3$ in network 23, producing a total delay of $D_2+D_3$ for the I.D. pair. The output of network 23 therefore appears as in waveform D′ of FIG. 3. This wave is mixed with wave C in mixer 5 to produce the message "on" video output E′ of FIG. 3. Wave E therefore represents the message "off" condition and wave E′ the message "on" condition.

At the beacon (FIG. 2) the video output of detector 8 during the message "on" condition at the radar is as represented by E′ in FIG. 4. This is converted to the waveform G′ by the decoder circuit 9–10. The wave G′ is applied both directly and through a delay circuit 24 to coincidence circuit 25, the output of delay 24 being represented by H in FIG. 4. The delay of $D_2+D_3$ brings the track pulse and the I.D. pulse into coincidence in circuit 25 thus producing a message output from this circuit in the form of pulses at the radar P.R.F., as represented by waveform I in FIG. 4. This output is applied to any suitable message receiver or terminal device 26. The terminal device may be any apparatus for displaying, recording or otherwise making known the sequential time intervals during which there is an output from circuit 25. During the message "off" condition at the radar ground station the identification spacing, as seen in waveform G, is $D_2$ rather than $D_2+D_3$ so that no output occurs from coincidence circuit 25.

In order to preserve the signal verification function at the radar during its message "on" condition, closure of contacts *d* of S–1 causes the gate N from gate generator 20 to undergo an additional delay $D_3$ in delay network 27. This brings the gate N into coincidence with the I.D. pulse to energize indicator 22 as indicated by waveforms G′, O′ and P′ in FIG. 5, the operation being analogous in all respects to that represented by waveforms G, O and P already explained for the message "off" condition.

Referring now to FIG. 2, message delay network 28 and beacon message sender switch S–2 are added for the beacon-to-radar communication channel. Contact *a* of S–2 is open in the beacon message "off" condition. For the message "on" condition S–2 is actuated to close contact *a*. The video output of circuit 10, G or G′ as seen in FIG. 4, is now applied both directly and through delay 28 to mixer 11 (waveform J) causing a pulse to appear at a delay $D_4$ relative to both the track and I.D. pulses in the output of mixer 11, as shown by waveform K. Waveform K is drawn for the message "off" condition at the radar, represented by waveform G. A similar waveform would be produced for the radar message "on" condition, represented by waveform G′, except for the greater interval between the track and I.D. pulses. As will be seen later, only the pulse inserted after the track pulse is used for message transmission.

At the radar (FIG. 1) waveform K (FIG. 5) appears at the output of video detector 14 and is applied directly to coincidence circuit 29. The gate pulse produced by generator 20 and illustrated by waveform N is delayed an interval $D_4$ in delay network 30, the delayed gate pulse being illustrated by waveform Q in FIG. 5. In this manner the message pulse in wave K is gated through coincidence circuit 29 to the message receiver or terminal equipment 26′, which may be similar to terminal equipment 26 at the beacon (FIG. 2). The message output of circuit 29 is represented by waveform R and, as at the beacon, is a series of pulses at the radar P.R.F.

Switches S–1 and S–2 may be manually actuated for the transmission of messages in telegraphic or Morse code, or the keying may be accomplished manually or automatically in accordance with any other prearranged code. Switches S–1 and S–2, or their electrical equivalents, may also be actuated automatically in accordance with any other low frequency information that it is desired to transmit, provided the frequency does not exceed the limits defined earlier. For example, S–2 at the spacecraft beacon may be automatically closed momentarily at each systole of an astronaut's heart in order to transmit the pulse rate to the ground station. A typical Morse code transmission is illustrated in FIG. 6, waveform S representing the message envelope and waveform T representing the output signal from coincidence circuit 29 of FIG. 1 or 25 of FIG. 2.

If desired, the antenna pattern "wobbulation" feature of the beacon, referred to earlier, may be employed as a back-up for the beacon-to-radar message transmission. Referring to FIG. 2, block 31 represents apparatus at the beacon for effecting the required oscillatory movement of the beacon antenna pattern past the radar line of sight. The frequency of this oscillation is usually 26 c.p.s. and it manifests itself at the radar receiver as a 26 c.p.s. amplitude modulation of the video output. Therefore by providing at the beacon a normally closed contact *b* on S–2 to open and disable circuit 31 during the message "on" condition, and by providing at the radar (FIG. 1) a 26 c.p.s. filter 32 to separate the 26 c.p.s. amplitude modulation from the video signal and apply it to a suitable message terminal device 33, a second or back-up channel for the beacon-to-radar message may be provided. The output of filter 32 is represented by waveform U of FIG. 6.

I claim:

1. In a radar tracking system employing a beacon at the target, wherein the radar periodically radiates an interrogating signal comprising a tracking pulse followed after a predetermined fixed time interval by an identification pulse, and wherein the beacon reply similarly comprises a tracking pulse followed after said fixed interval by an identification pulse, apparatus providing two-way communication between said radar and said beacon, said apparatus comprising: a selectively operable message sending means at said radar for changing the value of said fixed time interval; a radar message receiving means at said beacon responsive only to a pair of successive pulses separated by the changed value of said fixed time interval; a selectively operable message sending means at said beacon for inserting a pulse between the tracking and identification pulses of said beacon reply at a fixed delay after said track pulse; and a beacon message receiving means at said radar responsive only to a pair of successive pulses separated by said fixed delay.

2. Apparatus as claimed in claim 1 in which said radar message receiving means comprises a coincidence circuit to which the track and identification pulses of said interrogating signal are applied both directly and after a delay equal to the changed value of said fixed time interval, and means coupled to the output of said coincidence circuit to indicate the presence of an output signal therefrom; and in which said beacon message receiving means comprises a coincidence circuit, means for generating a gating pulse that is coincident with the track pulse in the received beacon reply, means for delaying said gate pulse by an interval equal to said fixed delay, means for applying the delayed gate pulse to the last named coincidence circuit, and means coupled to the output of the last named coincidence circuit to indicate the presence of an output signal therefrom.

3. Apparatus as claimed in claim 1 in which said radar tracking system also employs at said beacon means for oscillating the beacon antenna pattern relative to the radar line of sight at a constant frequency, means coupled to said beacon message sending means for disabling said antenna pattern oscillating means when said sending means is operated, and an additional beacon message receiving means at said radar responsive only to an amplitude modulation of the received beacon reply at the frequency of said pattern oscillation for indicating the absence of such modulation.

References Cited

UNITED STATES PATENTS 3,035,260 5/1962 Freedman et al. ------ 343—6.5

RODNEY D. BENNETT, *Primary Examiner.*

M. F. HUBLER, *Assistant Examiner.*